(12) United States Patent
Haase et al.

(10) Patent No.: US 12,469,690 B2
(45) Date of Patent: Nov. 11, 2025

US012469690B2

(54) DESORPTION ION SOURCE WITH POST-DESORPTION IONIZATION IN TRANSMISSION GEOMETRY

(71) Applicant: Bruker Daltonics GmbH & Co. KG, Bremen (DE)

(72) Inventors: Andreas Haase, Bremen (DE); Jens Höhndorf, Bremen (DE); Jens Boßmeyer, Bremen (DE)

( * ) Notice: Subject to any disclaimer, the term of this patent is extended or adjusted under 35 U.S.C. 154(b) by 926 days.

(21) Appl. No.: 17/684,056

(22) Filed: Mar. 1, 2022

(65) Prior Publication Data

US 2022/0285142 A1 Sep. 8, 2022

(30) Foreign Application Priority Data

Mar. 5, 2021 (DE) ........................ 102021105327.7

(51) Int. Cl.

*H01J 49/04* (2006.01)
*H01J 49/16* (2006.01)
*H01J 49/24* (2006.01)

(52) U.S. Cl.

CPC ........ *H01J 49/0463* (2013.01); *H01J 49/164* (2013.01); *H01J 49/24* (2013.01)

(58) Field of Classification Search

CPC .. H01J 49/0463; H01J 49/164; H01J 49/0004; H01J 49/40; H01J 49/0418;

(Continued)

(56) References Cited

U.S. PATENT DOCUMENTS 5,828,063 A 10/1998 Koester
6,111,251 A 8/2000 Hillenkamp (Continued)

FOREIGN PATENT DOCUMENTS

DE 69718438 T2 10/2003
DE 102010052975 A1 5/2012

(Continued)

OTHER PUBLICATIONS

WO2007097285, machine translation (Year: 2007).*

(Continued)

*Primary Examiner* — Michael J Logie
(74) *Attorney, Agent, or Firm* — Benoît & Côté Inc.

(57) ABSTRACT

An apparatus to generate ions from sample material deposited on a substrate which is at least partially transparent to electromagnetic waves, comprises: —a support device having a holder for the substrate, —a desorption/ionization unit including a desorption device and an ionization device, said desorption device being configured to desorb deposited sample material from a desorption site on the substrate using at least one energy burst, and said ionization device being configured to irradiate the desorbed sample material above the substrate with electromagnetic waves after the at least one energy burst, wherein the electromagnetic waves pass through the substrate before encountering the desorbed sample material at a location which corresponds to the desorption site, and—an extraction device which is arranged and designed to extract ions from the desorbed sample material and transfer them into an analyzer. The invention also relates to a correspondingly arranged method.

14 Claims, 9 Drawing Sheets

(58) Field of Classification Search
CPC .......... H01J 49/161; H01J 27/24; H01J 49/16; H01J 49/162; H01J 37/20; H01J 49/0031
See application file for complete search history.

(56) References Cited

U.S. PATENT DOCUMENTS

| | | | | |
|---|---|---|---|---|
| 7,180,058 B1 * | 2/2007 | Izgarian | .................. | H01J 27/24 250/281 |
| 10,037,878 B2 | 7/2018 | Haase | | |
| 10,236,173 B2 | 3/2019 | Bossmeyer et al. | | |
| 2002/0134765 A1 * | 9/2002 | Tanaka | ............... | B23K 26/0608 219/121.6 |
| 2005/0092916 A1 * | 5/2005 | Vestal | ................... | H01J 49/061 250/423 P |
| 2010/0213367 A1 * | 8/2010 | Miller | .................... | G01N 1/405 436/175 |
| 2013/0302847 A1 | 11/2013 | Mix | | |
| 2020/0075304 A1 * | 3/2020 | Vestal | ...................... | H01J 49/40 |
| 2021/0118661 A1 * | 4/2021 | Corkum | .............. | H01J 49/0463 |

FOREIGN PATENT DOCUMENTS

| | | | | |
|---|---|---|---|---|
| DE | 102015115416 A1 | 3/2017 | | |
| DE | 102016124889 A1 | 6/2018 | | |
| DE | 102020120394.2 A1 | 2/2022 | | |
| EP | 1271609 A2 | 1/2003 | | |
| WO | 2003050517 A1 | 6/2003 | | |
| WO | WO-2007097285 A1 * | 8/2007 | .......... | H01J 49/0463 |
| WO | 2010085720 A1 | 7/2010 | | |
| WO | 2012072467 A2 | 6/2012 | | |
| WO | 2020046892 A1 | 3/2020 | | |

OTHER PUBLICATIONS

Mathieu, H.J., et al., "Use of Post-Ionisation Techniques to Complement SIMS Analysis. A Review With Practical Aspects", High Temperature Materials and Processes, vol. 17: No. 1-2, 1998, 29-44.

Soltwisch, Jens, et al., "Mass spectrometry imaging with laser-induced postionization" (Science 348 (6231), 211-215.

Spivey, Eric C., et al., "Combining MALDI-2 and Transmission Geometry Laser Optics to Achieve High Sensitivity for Ultra-High Spatial Resolution Surface Analysis", Journal of Mass Spectrometry, vol. 54, Issue 4, Apr. 2019, 366-370.

Niehaus, M., et al., "Transmission-mode MALDI-2 mass spectrometry imaging of cells and tissues at subcellular resolution", Nature Methods vol. 16, pp. 925-931 (2019).

Elia, Efstathios A., et al., "Atmospheric pressure MALDI mass spectrometry imaging using in-line plasma induced post-ionization", Anal. Chem. 2020, 92, 23, 15285-15290.

* cited by examiner

DESORPTION ION SOURCE WITH POST-DESORPTION IONIZATION IN TRANSMISSION GEOMETRY

BACKGROUND OF THE INVENTION

Field of the Invention

The invention relates to an apparatus to generate ions from deposited sample material, particularly for analytical systems (e.g., mobility spectrometers, mass spectrometers, and combined mobility-mass spectrometers), and applications for the further investigation and analysis of the ions generated.

Description of the Related Art

The Prior Art is explained below with reference to a specific aspect. This shall not be understood as a limitation to the disclosure of the invention that follows thereafter, however. Useful further developments and modifications of what is known from the Prior Art can also be applied above and beyond the comparatively narrow scope of this introduction, and will easily be evident to practitioners skilled in the art in this field after reading the disclosure which follows this introduction.

The combination of desorption of a deposited sample with subsequent (post) ionization of the desorbed material has been known for a long time in mass spectrometry. This post-desorption ionization improves the ionization efficiency and thus increases the measurement sensitivity, particularly for molecules which are strongly diluted in the sample and/or difficult to ionize. One example is secondary ion mass spectrometry (SIMS), which was complemented and expanded by secondary neutral mass spectrometry (SNMS) using a post-desorption ionization modality. The review titled "Use of Post-Ionisation Techniques to Complement SIMS Analysis. A Review With Practical Aspects" by H. J. Mathieu et al. (in *High Temperature Materials and Processes*, Vol. 17: No. 1-2, 1998, 29-44) deals with this topic.

SIMS, either accompanied by SNMS or not, is predominantly used for surface analysis and usually on untreated samples, wherein the atomic and molecular ions that are to be detected are generated directly through the interaction with energetic primary ion beams in a high vacuum. Matrix-assisted laser desorption/ionization (MALDI), on the other hand, uses a crystal-forming matrix substance as its ionization mediator. The crystallized matrix substance into which the sample is embedded can absorb laser light (often in the ultraviolet region of the spectrum), and reacts to the laser bombardment with ablation, generation of an (over) supply of charge carriers, and transfer of charge carriers to the simultaneously ablated sample molecules.

MALDI mass spectrometry likewise faces the challenge of increasing the ionization yields for molecular ions, and this has led to post-desorption ionization modalities being tried out in this field also. One example can be found in the publication WO 2010/085720 A1. It describes an approach wherein an ablation laser beam is directed from the front onto the specimen slide on which the sample has been deposited, and beams of a post-desorption laser or several post-desorption lasers ("POSTI Lasers") are guided through the desorption cloud in a plane parallel to and just above the specimen slide. A similar set-up is described in the publication by Jens Soltwisch et al. "Mass spectrometry imaging with laser-induced postionization" (Science 348 (6231), 211-215); in this case it is called MALDI-2.

As an alternative to ablation from the front, post-desorption ionization modalities for MALDI ion sources with transmission geometry were also tested, in which the ablation laser beam passes through the suitably transparent specimen slide in order to bring the laser energy for the ablation into the sample from the rear. Examples of such arrangements can be found in the publications "Combining MALDI-2 and Transmission Geometry Laser Optics to Achieve High Sensitivity for Ultra-High Spatial Resolution Surface Analysis" by Eric C. Spivey et al. (Journal of Mass Spectrometry, Volume 54, Issue 4, April 2019, 366-370), "Transmission-mode MALDI-2 mass spectrometry imaging of cells and tissues at subcellular resolution" by M. Niehaus et al. (Nature Methods volume 16, pages 925-931 (2019)) and "Atmospheric Pressure MALDI Mass Spectrometry Imaging Using In-Line Plasma Induced Postionization" by Efstathios A. Elia et al. (Anal. Chem. 2020, 92, 23, 15285-15290), the latter with reference to a plasma-induced post-ionization modality.

Extending this to optical post-ionization modalities, the publication WO 2020/046892 A1 describes a device and method for irradiating samples on a specimen slide from both the front and the rear using small-diameter, laser-generated optical beams for imaging mass spectrometry with subcellular spatial resolution. Some embodiments generate optical beams of minimal diameter, which essentially correspond to the diffraction limit of twice the laser wavelength. It is thought that a high degree of sensitivity for MALDI-TOF imaging from individual laser shots of every laser can thus be achieved for every pixel in the image.

In view of the foregoing, there is a need for a further substantial increase in the sensitivity of LDI-MS (LDI=laser desorption/ionization), for example by MALDI-2, especially for imaging (mass spectrometry imaging—MSI). Further objectives that can be achieved by the invention will be immediately clear to the person skilled in the art from reading the disclosure below.

SUMMARY OF THE INVENTION

According to a first aspect, the invention relates to an apparatus to generate ions from sample material deposited on a substrate that is at least partially transparent to electromagnetic waves, comprising: —a support device which has a holder for the substrate, where the substrate may take the form of a glass plate that is transparent to electromagnetic waves in the ultraviolet, visible and/or infrared region of the spectrum, —a desorption/ionization unit comprising a desorption device and an ionization device, said desorption device being arranged and designed to desorb deposited sample material from a desorption site on the substrate using at least one energy burst, and said ionization device being arranged and designed to irradiate the desorbed sample material above the substrate after the at least one energy burst using electromagnetic waves, wherein the electromagnetic waves pass through the substrate, before encountering the desorbed sample material, at a location which corresponds to the desorption site, and—an extraction device which is arranged and designed to extract ions from the desorbed sample material and transfer them into an analyzer.

Guiding electromagnetic waves in transmission through a substrate from which sample material has been (substantially to almost completely) desorbed by a preceding energy burst, or a short sequence of energy bursts, at a desorption location which can comprise a fraction of the total samplebearing area of the substrate, allows the optical elements such as lenses or mirrors, which are required for the beam guidance, to be located away from the space in which the ions are generated and guided. This makes it considerably easier to design the ion source, since these optical elements do not affect the electrical potential in the ionization space, which serves to guide the ions, particularly when the optical elements have a large aperture and are therefore located close to the desorption site. Furthermore, the arrangement of the ionization device according to the invention is advantageous, because it eliminates the risk of the optical elements becoming contaminated.

In addition, the beam of electromagnetic waves for post-desorption ionization penetrates the desorption cloud in a direction which substantially coincides with the direction of propagation of the cloud (usually largely parallel to the normal to the substrate surface). The interaction path between the electromagnetic waves and the desorbed sample material is thus extended, particularly compared with arrangements from the Prior Art, e.g., MALDI-2, where a post-desorption ionization pulse has an essentially perpendicular orientation to the direction of propagation of the desorption cloud. As a consequence, the electromagnetic waves can excite desorbed neutral molecules across substantially the whole extent of the cloud, even if they have already moved away from the substrate surface, and this results in a correspondingly enlarged supply of charge carriers, and not only in a comparatively narrow focus of a laterally incident beam directly above the substrate, as in the Prior Art. Moreover, the irradiation with electromagnetic waves for the post-desorption ionization can thus be extended to periods of up to several milliseconds before a next desorption site on the substrate is targeted, which also increases the ionization probability, and thus the ionization yield.

In various embodiments, the support device may contain a chamber in which the holder for the substrate is located, and which is arranged and designed to create a conditioned environment for the substrate, including the deposited sample material. For example, it is possible to connect the chamber to a vacuum source to evacuate the environment of the deposited sample material, e.g., a pump. The vacuum source can be arranged and designed to maintain a pressure that is substantially higher than a high vacuum ($>10^{-3}$ hectopascal) and lower than around $10^2$ hectopascal ($<$atmospheric pressure), e.g., 1-10 hectopascal.

In various embodiments, the chamber may be connected to a gas feed device which is arranged and designed to feed an inert buffer gas, a reactive gas (e.g., methane), a moist gas (e.g., water vapor), and/or a dopant gas which is susceptible of absorbing electromagnetic waves, into the chamber. Molecular nitrogen or helium are possible inert buffer gases, for example. The dopant gas, for example a polar aprotic solvent such as acetone, a polar protic solvent such as isopropanol, or a nonpolar solvent such as toluene, as described in the parallel application DE 102020120394.2 of the applicant, is preferably able to absorb the electromagnetic waves, and it reacts to them by exciting and supplying additional charge carriers, e.g., protons, which can be transferred to neutral, desorbed sample molecules in chemical reactions, either directly by the excited molecules of the dopant gas or in a reaction cascade. The dopant gas is also preferably volatile, and has a high vapor pressure to prevent excessive deposition on the surfaces in the device, e.g., the ion source, and also downstream components of the analyzer.

In various embodiments, the desorption device is preferably arranged and designed to direct an energetic beam onto the deposited sample material in order to trigger the at least one energy burst. The energetic beam can be a laser beam to ablate deposited sample material. The laser beam can particularly be pulsed; furthermore, a plurality of identical or similar laser pulses generated in quick succession can be used for the desorption/ablation. It is preferable for the energetic beam to pass through the substrate at the position which corresponds to the desorption site before it encounters the deposited sample material. A different type of energy burst, which can act on deposited sample material for the purpose of desorption, can be generated by, for example, locally focused sound waves with ultrashort pulse duration, e.g., in an acoustic transducer substrate that is partially transparent to electromagnetic waves.

In various embodiments, the ionization device can incorporate a laser to generate coherent electromagnetic waves, a (wide-band) discharge lamp, or a light-emitting diode (LED). The wavelength of the laser light is preferably in the ultraviolet region of the spectrum, below 400 nanometers, for example at 355 nanometers, 349 nanometers, 337 nanometers, or 266 nanometers, as can be generated by many widely available solid-state and gas lasers. It is possible to use a laser with pulsed operation or continuous-wave operation in discontinuous mode, or a discharge lamp or LED with flash-like or continuous emission characteristic. The discharge lamp can be an arc discharge lamp with high-intensity wide-band photon emission, e.g., a UV flash lamp such as a Xenon flash lamp, or a hydrogen/deuterium discharge lamp or similar.

In various embodiments, the ionization device is preferably arranged and designed to irradiate desorbed sample material with a pulse of electromagnetic waves which is temporally coordinated with the at least one energy burst. In the case of a pulsed laser, the pulse duration can be several nanoseconds. The irradiation period of a continuous-wave laser operated in discontinuous mode after the at least one energy burst for the desorption, before the support device moves the substrate into a different desorption position, may be several microseconds. The irradiation period can sometimes last a few tens of microseconds, until the desorption cloud is greatly thinned out, or the density of the desorption cloud has reduced considerably. The timescale of such a process depends, in particular, on the ambient pressure at the desorption site, and the set-up and operation of the extraction device, e.g., gas-dynamic and/or electromagnetic, e.g., continuous or pulsed extraction of ions, or combinations thereof, e.g., a continuous gas flow plus a possibly pulsed extraction voltage.

In various embodiments, the desorption device and the ionization device can use the same original beam of coherent electromagnetic waves, which can be conditioned to have different energies for the desorption/ablation and the ionization respectively, as has been described in the application DE 10 2016 124 889 A1 (corresponding to GB 2 558 741 A, US 2018/0174815 A1 and CN 108206126 A) of the applicant, for example. Coherent light of the original wavelength of 1064 nanometers in the near-infrared can, for example, be frequency-tripled to 355 nanometers for the desorption/ablation, and frequency-quadrupled to 266 nanometers for the post-desorption ionization, on different multiplier paths. The requisite multiplier crystals can be located in the optical path, on parallel forked branches, after which the beam path is merged into a single path again, before passing through optical imaging elements such as lenses, the support device, and the substrate itself.

To ensure that only a beam of a predetermined wavelength passes through the support device and the substrate in each case, an electrooptical gate can be located where the beam begins to fork. Depending on the switching state, the electrooptical gate can guide coherent electromagnetic waves of a first polarization into the first branch of the fork, where a first multiplier path is located, e.g., for an energy tripling, and those of a second polarization into the second branch of the fork, where a second multiplier path is located, e.g., for an energy quadrupling. The polarization of the original beam can be adjusted using a method explained in the application DE 10 2015 115 416 A1 of the applicant (corresponding to GB 2 542 500 A, US 2017/0076932 A1 and ON 106531607 A), for example. Alternatively, it is also conceivable to locate a beam splitter in front of the fork, said beam splitter redirecting the original beam simultaneously onto the two parallel paths, and to locate one electrooptical switch per path in front of the point where the two parallel paths merge again, the operation of the switches being coordinated such that only one of them is switched to allow passage at any one time, while the other one blocks the beam path, e.g., by means of a switchable diaphragm.

In various embodiments, the extraction device can contain at least one deflection electrode, which is arranged and designed so that extracted ions change their direction of motion at least once. The deflection electrode can be supplied with a voltage continuously, in pulses, or discontinuously, said voltage either attracting or repelling the ions, depending on the electrical polarity, so as to bring about a change in the direction of motion. In further embodiments, the extraction device can use gas-dynamic principles to extract ions from the desorbed sample material and pass them on to an analyzer. For example, transfer elements such as transfer capillaries can be provided which generate a gas flow to downstream chambers or spaces which are at a lower pressure, so as to entrain ions from the desorbed sample material. In preferred embodiments, the extraction device combines gas-dynamic principles, for example by generating directed gas flows, and electrodynamic principles, for example by applying voltages, continuously applied or pulsed, where necessary, so as to extract ions from the desorbed sample material and pass them on to downstream components such as a mobility analyzer, mass analyzer, or combined mobility-mass analyzer.

According to a second aspect, the invention also relates to a method to generate ions from sample material, comprising: —Depositing the sample material on a substrate which is at least partially transparent to electromagnetic waves, —Desorbing deposited sample material from a desorption site on the substrate using at least one energy burst, —Ionizing particles and/or molecules in the desorbed sample material above the substrate by irradiating them with electromagnetic waves which pass through the substrate at a position which corresponds to the desorption site before they encounter the desorbed sample material, and—Extracting ions from the desorbed sample material and transferring them into an analyzer.

In various embodiments, the sample material can comprise a tissue section, a homogenate, or individual material deposits on the substrate. For example, a tissue section can be a microtomized thin section of an animal organ, e.g., liver, kidney, or brain of laboratory mice, which is to be investigated and analyzed with a mass spectrometer and/or a mobility spectrometer in respect of the spatial distribution of analyte molecules of interest. A special embodiment can consist in material of the tissue section being desorbed by electromagnetic waves whose wavelength is strongly absorbed (e.g., in the near-infrared) by the water contained in the tissue section (especially across the entire layer thickness of the tissue section so as to be able to work in transmission). A material deposit can, for example, encompass a preparation produced drop by drop (i.e., individually) on a sample support such as a MALDI matrix preparation in an array of similar preparations, as are prepared on a sample support of the AnchorChip™ type (Bruker Daltonics GmbH & Co. KG), for example. A common feature of all these sample materials is that their substrate has a plurality of desorption sites which are spatially offset with respect to each other and/or spatially separated from each other, said sites being processed in a predetermined sequence with the method or an apparatus described above.

Particularly preferred is a method as described above which is carried out on an apparatus as described above.

BRIEF DESCRIPTION OF THE DRAWINGS

The invention can be better understood by referring to the following illustrations. The elements in the illustrations are not necessarily to scale, but are primarily intended to illustrate the principles of the invention (mostly schematically). The same reference numbers designate the same elements in the various diagrams.

DETAILED DESCRIPTION

While the invention has been illustrated and explained with reference to a number of embodiments thereof, those skilled in the art will recognize that various changes in form and detail can be made without departing from the scope of the technical teaching, as defined in the attached claims.

Figure 1A:
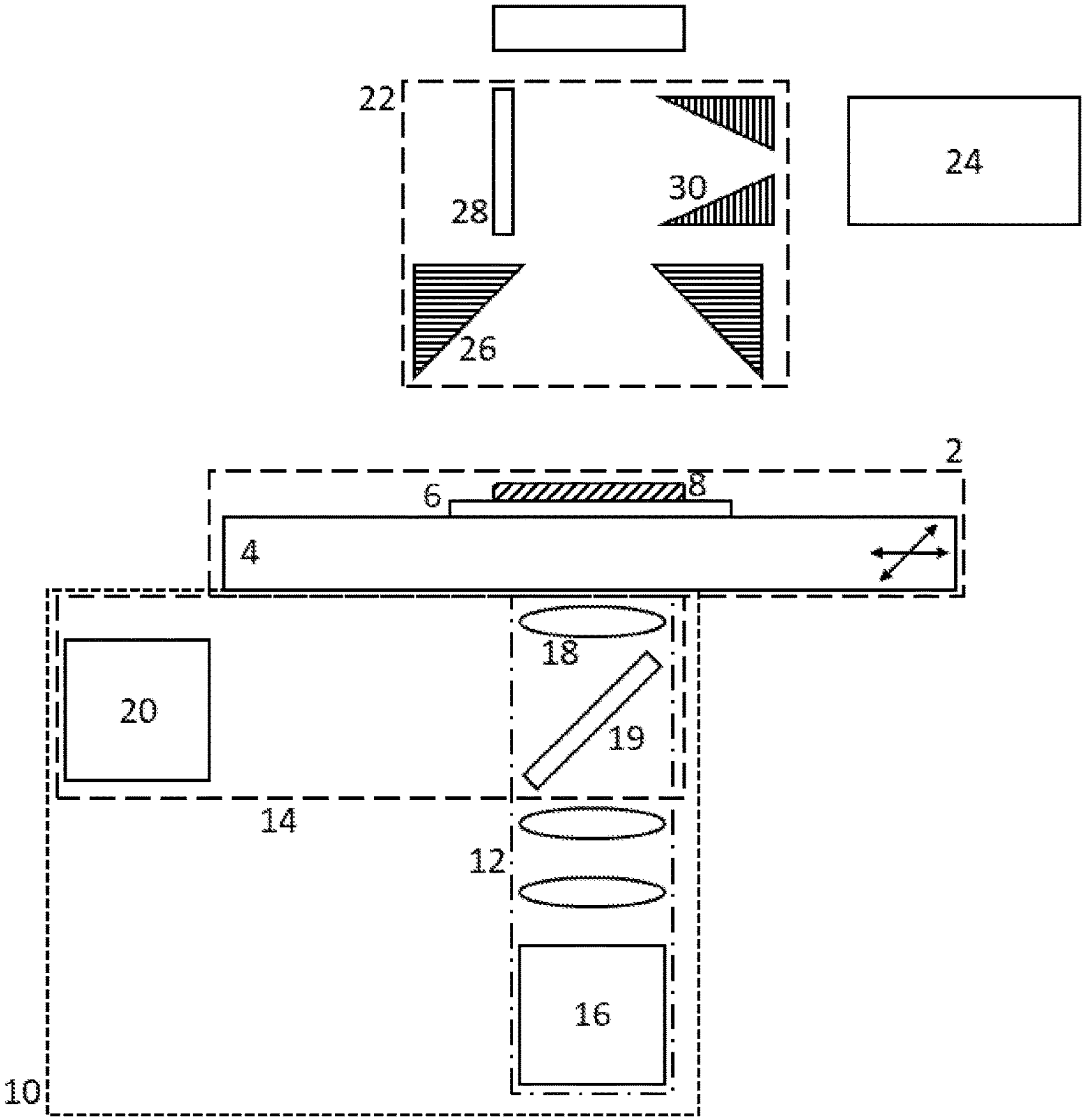
FIG. 1A shows a schematic example embodiment of a device according to the present disclosure.

FIG. 1A schematically illustrates a set-up of a first example embodiment. It shows a support device (2) with a holder (4) for a substrate (6), which carries sample material (8). The holder (4) can be a positioning device; for example, it can be designed in the style of an x-y translation stage which can be moved in two spatial directions in order to sequentially bring several desorption sites on the substrate (6) into a desorption position. Alternative translation devices allow movement in the z-direction also (perpendicular to the substrate surface) so as to adjust optical focal points and/or to compensate for morphological differences between sample material and substrate material (e.g., glass), for example. As an alternative to the illustrated embodiment as a solid plate, the holder (4) can also take the form of a frame which holds a substrate (6) essentially on the narrow sides so that the large surfaces on the front and rear are largely untouched and left free. This set-up is particularly advantageous for the passage of electromagnetic waves. The substrate (6) is preferably a sample support with standard dimensions, such as the dimensions of a microtitration plate as frequently used for mass spectrometric and/or mobility spectrometric measurements of desorbed molecules, and at least partially transmits electromagnetic waves. It can be a glass specimen slide as is usual in microscopy. As illustrated, the sample material (8) can be a single flat piece of sample material, such as a tissue section, which is scanned for a mass spectrometric measurement to generate a two-dimensional view ("map") of its molecular composition, e.g., for biomolecules (such as proteins, peptides, lipids, glycans, etc.), pharmaceuticals, metabolites, and such like.

The view in FIG. 1A shows a desorption/ionization unit (10) below the support device (2). This unit comprises a desorption device (12) and an ionization device (14). In this embodiment, the desorption device (12) contains a laser system (16) to generate an energetic laser beam, which is guided via different optical elements, such as lenses and mirrors, to the support device (2) in such a way that it passes through the support device (2) and the substrate (6) at a position which corresponds to the desorption site on the front of the substrate (6). The energetic beam can then interact with sample material (8) at the desorption site on the front of the substrate (6), and the applied energy causes the corresponding section of the sample material to ablate into a continuously expanding cloud at the desorption site above the substrate (6). Guiding a high-energy desorption beam in transmission through the substrate (6) allows the last imaging lens (18) to be positioned very close to the substrate (6), which makes it technically very easy to focus the beam into a very small focal point at the desorption site on the surface of the substrate (6). The latter is a condition for scanning flat sample material (8), e.g., a tissue section, with subcellular grid dimension (<1 micrometer) for single cell analyses.

In this embodiment, the ionization device (14) contains a light source (20), which can take the form of a laser system, for example. The ionization device (14) shown shares some of its optical elements with the desorption device (12). In the example shown, these are firstly a semitransparent mirror (19), which serves to deflect the electromagnetic waves emitted by the light source (20), while transmitting the laser beam of the desorption device (12), and secondly the imaging lens (18), where the lens (18) can also be seen as a placeholder for a more complex lens system. The lens (18) or the corresponding lens system preferably has chromatic correction. The electromagnetic waves of the light source (20) are transmitted, in temporal coordination with the desorption, through the support device (4) and the substrate (6) into the desorption cloud above the desorption site, where they interact directly or indirectly with the desorbed sample material in the gaseous phase by way of secondary chemical reactions and initiate further ionization.

The holder (4) and the substrate (6) as well as the last imaging lens (18) preferably take a form such that they essentially have the same transmission and, if applicable, imaging properties for electromagnetic waves of different wavelengths, for example 355 nanometers for the laser beam of the desorption device (12), and 266 nanometers for the beam of electromagnetic waves of the ionization device (14). Suitable materials for these light-transmitting elements are silica glass and calcium fluoride, for example, preferably in a chromatically compensated embodiment as a lens system.

The view in FIG. 1A shows an extraction device (22) above the support device (2). The extraction device (22) contains several electrodes, to which voltages can be permanently or temporarily applied so that ions are extracted from the desorption cloud and guided to a mobility analyzer system, mass analyzer system, or combined mobility-mass analyzer system (indicated schematically at (24)). In a first section, the extraction device (22) can include an electrode stack (26) in the form of an RF voltage funnel, i.e., apertured diaphragms arranged in sequence and having central apertures whose dimensions change over the stack, in particular become smaller, to bring about greater spatial focusing of the extracted ions. Consequently, the apertured diaphragm with the largest aperture faces the desorption site. Behind the RF funnel (26), and to the side of the ion path, is a deflection electrode (28), to which a voltage can be applied either permanently or temporarily, said voltage repelling the ions of a specific polarity to deflect their path into a second RF funnel (30), which is located opposite the deflection electrode (28) and whose inner apertures become progressively smaller in the direction away from the deflection electrode (28). The analyzer (24), which can be located in an environment at a different pressure level, e.g., at a lower pressure, then accepts the ions, which have undergone even greater spatial focusing, and processes them. Neutral particles and molecules in the desorption cloud are not affected by the deflection electrode (28), however, and can dissipate freely and thin out.

Figure 1B:
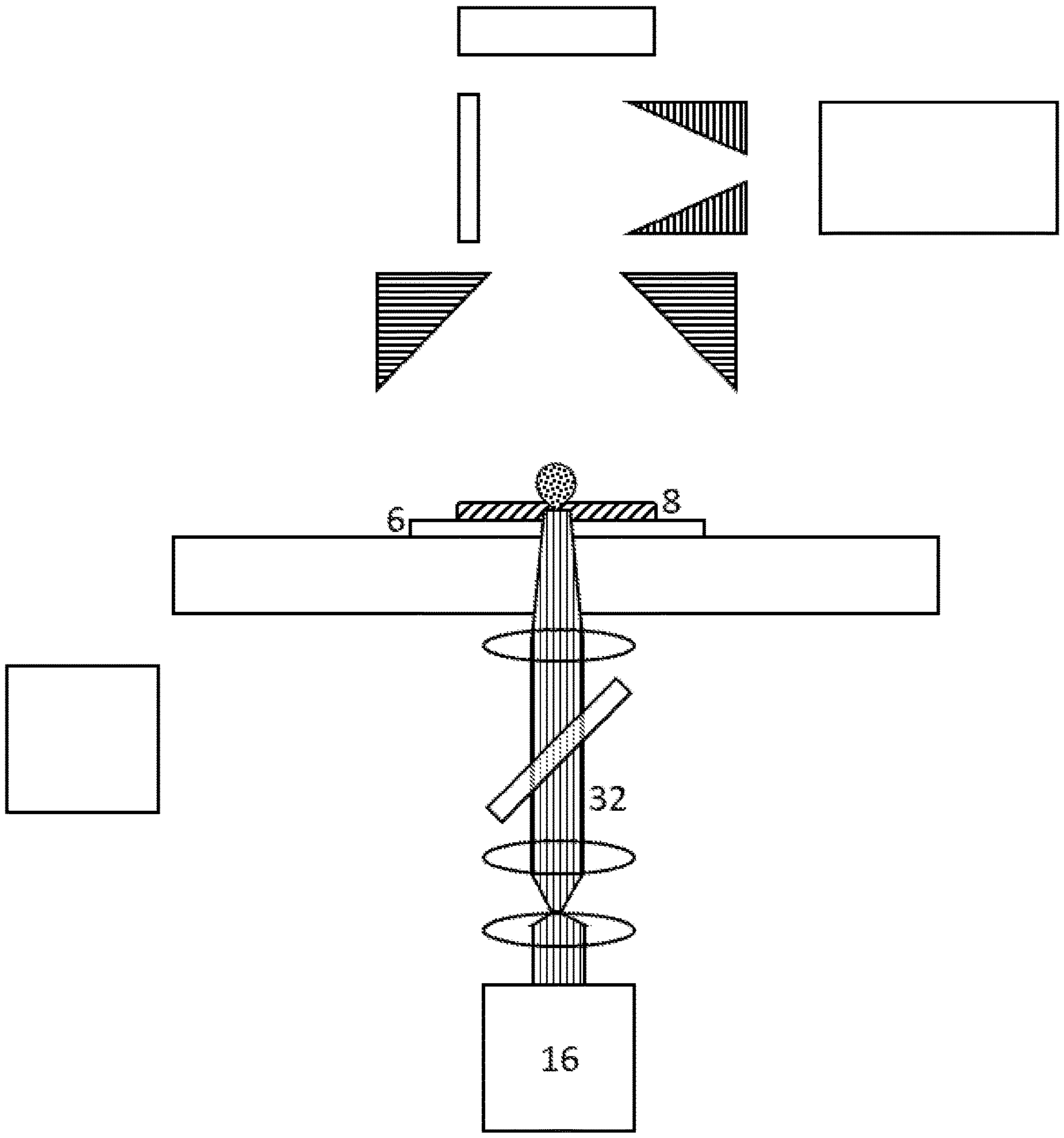
FIG. 1B schematically shows a first step in the operation of the device from FIG. 1A.

For a first step, FIG. 1B illustrates an energy burst for the desorption of sample material (8), wherein the laser system (16) of the desorption device emits a short energetic laser pulse (32), which penetrates the sample material (8) from the rear at a location which corresponds to the desorption site after it has passed through the optical guide elements, the support device, and the substrate (6). The sample material (8) can be a flat tissue section, which has been deposited on a glass plate and treated across the whole surface with a matrix substance which is present in a crystallized state. The laser light can have a wavelength of around 355 nanometers, for example, as can be generated by frequency-tripling the light of a Nd:YAG laser in the infrared region of the spectrum at 1064 nanometers. The prepared sample material (8) and the energy burst or a sequence of identical or similar energy bursts in rapid succession are coordinated in such a way that the sample material (8), including matrix substance, is almost completely ablated at the desorption site. This can be very reliably achieved by setting the number of pulses, the pulse length, and the fluence of the laser beam. Flat sample material (8), such as an approximately 10-micrometer-thick tissue section prepared with a matrix, can easily be desorbed completely on a local level.

Figure 1C:
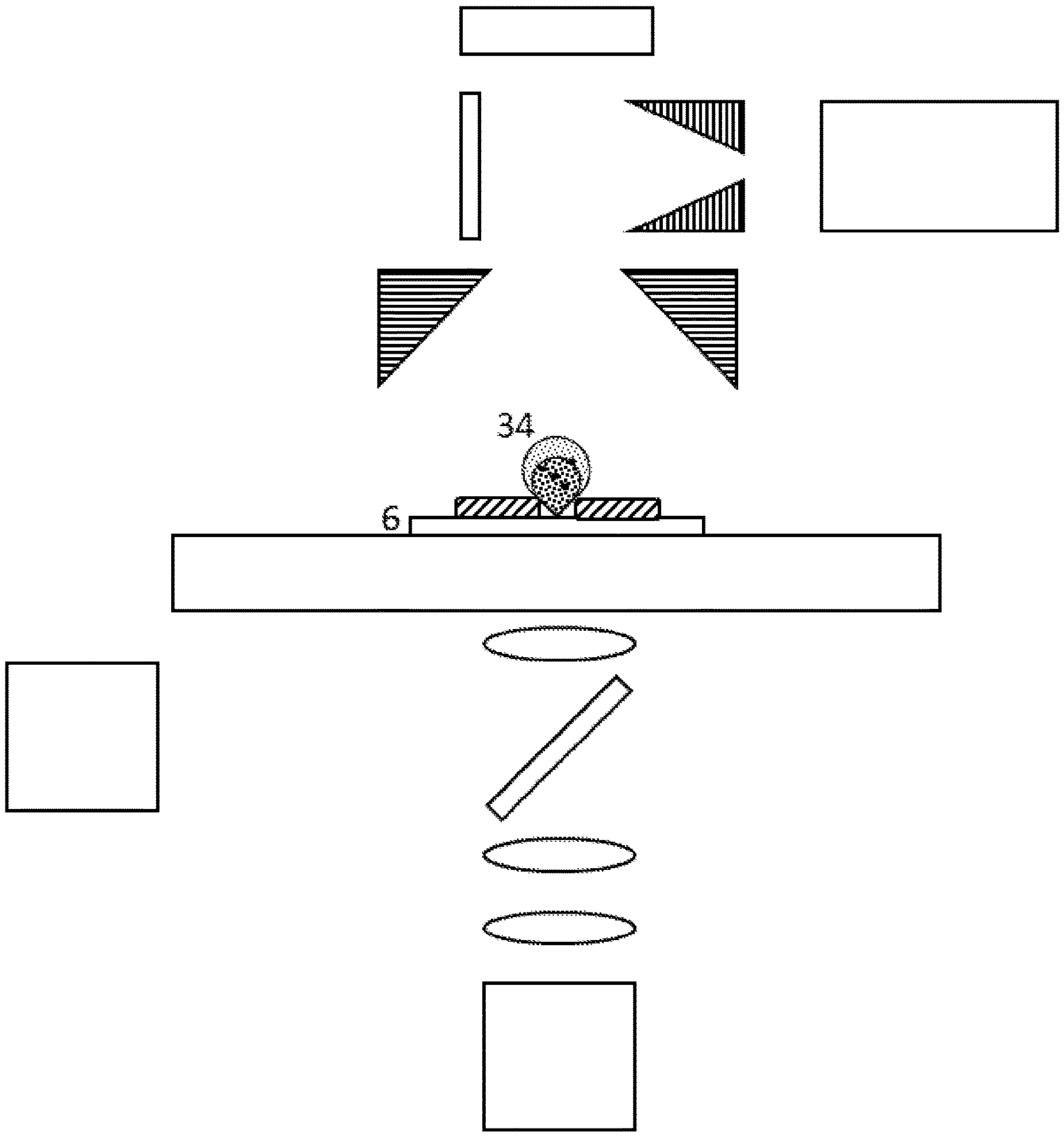
FIG. 1C schematically shows a second step in the operation of the device from FIG. 1A.

FIG. 1C depicts, for a second step, how the ablated sample material expands in the gaseous phase away from the desorption site and thereby thins out. In the present example, the preparation with a MALDI matrix substance on the substrate (6) ensures that the ablated matrix substance provides charge carriers in the form of protons, which are transferred to the simultaneously ablated sample molecules in the desorption cloud (34) and thus complete a first ionization step. Unfortunately, the comparatively low ionization efficiency of the simple MALDI process (MALDI-1 so to speak) means that a considerable proportion of the ablated neutral sample molecules are not ionized by the charge carriers that are generated by applying the one or more energy bursts. The ionization yield here can vary from molecular species to molecular species. It is known that lipids, for example, ionize relatively poorly under standard MALDI conditions.

Figure 1D:
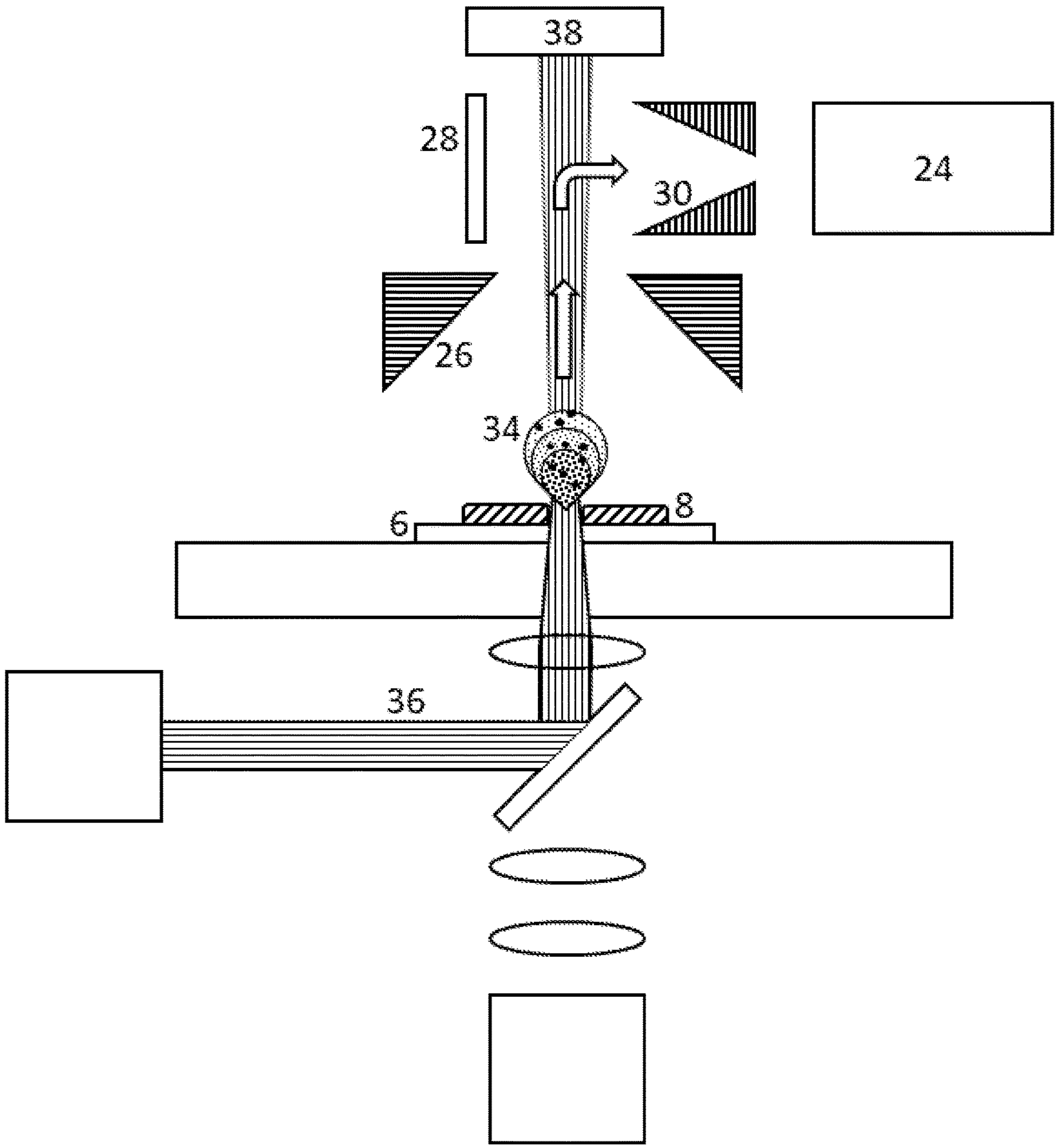
FIG. 1D schematically shows a third step in the operation of the device from FIG. 1A.

To further improve the ionization yield per energy burst or sequence of desorption energy bursts, energetic electromagnetic waves (36) are guided by the ionization device—as illustrated in FIG. 1D, for a third step—into the desorbed sample material above the desorption site, and they pass through the support device and the substrate (6) from the rear to the front—just like the ablation radiation of the desorption device. In this way, they arrive in the desorption cloud (34), where they interact with the ablated molecules and excite matrix molecules in particular, so that a larger number of charge carriers in the form of protons are provided, which are transferred to ablated, neutral sample molecules. This particularly benefits the ionization of highly diluted or difficult to ionize molecules, e.g., lipids, in the sample material (8). The electromagnetic waves (36) can take the form of pulses generated and emitted in rapid succession, by a pulsed laser for example, or they can originate from the ionization device being operated in discontinuous mode, e.g., a temporally limited operation of a continuous-wave laser, where the temporal limitation can be set particularly in the range of a few milliseconds, or a temporally limited emission period of a discharge lamp.

The state from FIG. 1C between the desorption step from FIG. 1B and the post-desorption ionization step from FIG. 1D should be regarded as a schematic illustration. The duration of the state between desorption and post-desorption ionization shown in FIG. 1C can be very short, for example a few microseconds or only a few nanoseconds. Embodiments in which a separate state with expansion of a desorption cloud, as shown in FIG. 1C, practically does not exist are also conceivable, namely when an energy burst or a sequence of energy bursts for the desorption, and a pulse of electromagnetic waves for the post-desorption ionization, follow each other almost without any time delay, with the requisite coordination of the desorption device and the ionization device. The small to almost non-existent time delay can have the advantage that the cloud of desorbed sample material is still quite dense when the electromagnetic waves penetrate it, which increases the probability of interaction between photons and desorbed particles.

The ions formed can be extracted from the desorption cloud by means of permanent or temporary voltages on the electrodes of the extraction device (26, 28, 30), and fed to the analyzer (24). Those electromagnetic waves (36) that have passed through the desorption cloud (34) without interacting with the molecules therein can be caught by a beam dump (38) located on the optical path behind the extraction device; this beam dump removes the energetic radiation from the device without it reaching unintended or undesirable places, or having any effect there.

The ionization device (14) from FIGS. 1A to 1D can operate with energetic laser radiation (32), for example with a wavelength of 266 nanometers, which can be generated by quadrupling the frequency of a Nd-YAG laser which originally has an infrared wavelength. The electromagnetic waves (36) used for the post-desorption ionization can also ablate or desorb residues of the sample material (8) at the desorption site, in addition to their effect on already desorbed or ablated sample material, if, contrary to expectation, the desorbing ablation pulse or the sequence of ablation pulses did not completely expose the substrate surface at the desorption site. The electromagnetic waves (36) of the ionization device can furthermore interact with pieces of the sample material (debris) which were formed during the desorption process and entrained in the desorption cloud in order to transfer sample material of this debris into the gaseous phase and ionize it. This additionally post-ablated or post-desorbed (residual) sample material can also further increase the yield of the ions generated, and thus likewise contributes to achieving the objective.

After the ions generated by the desorption/ablation and subsequent post-desorption ionization have been extracted from the desorption cloud (34) and passed on to the analytical system (24), the holder (4) can move the substrate (6) into another desorption position (x-y translation), possibly including an adjustment of the focus (z-translation) so that a still untouched portion of the sample material (8) can be analyzed. If the sample material (8) is a tissue section, its surface can thus be scanned in a specific sequence to compile a map of the molecular composition, e.g., in respect of lipids, proteins, peptides, glycans, or similar biomolecules, and also in respect of pharmaceuticals and their breakdown products, (endogenous) metabolites, etc.

Figure 2:
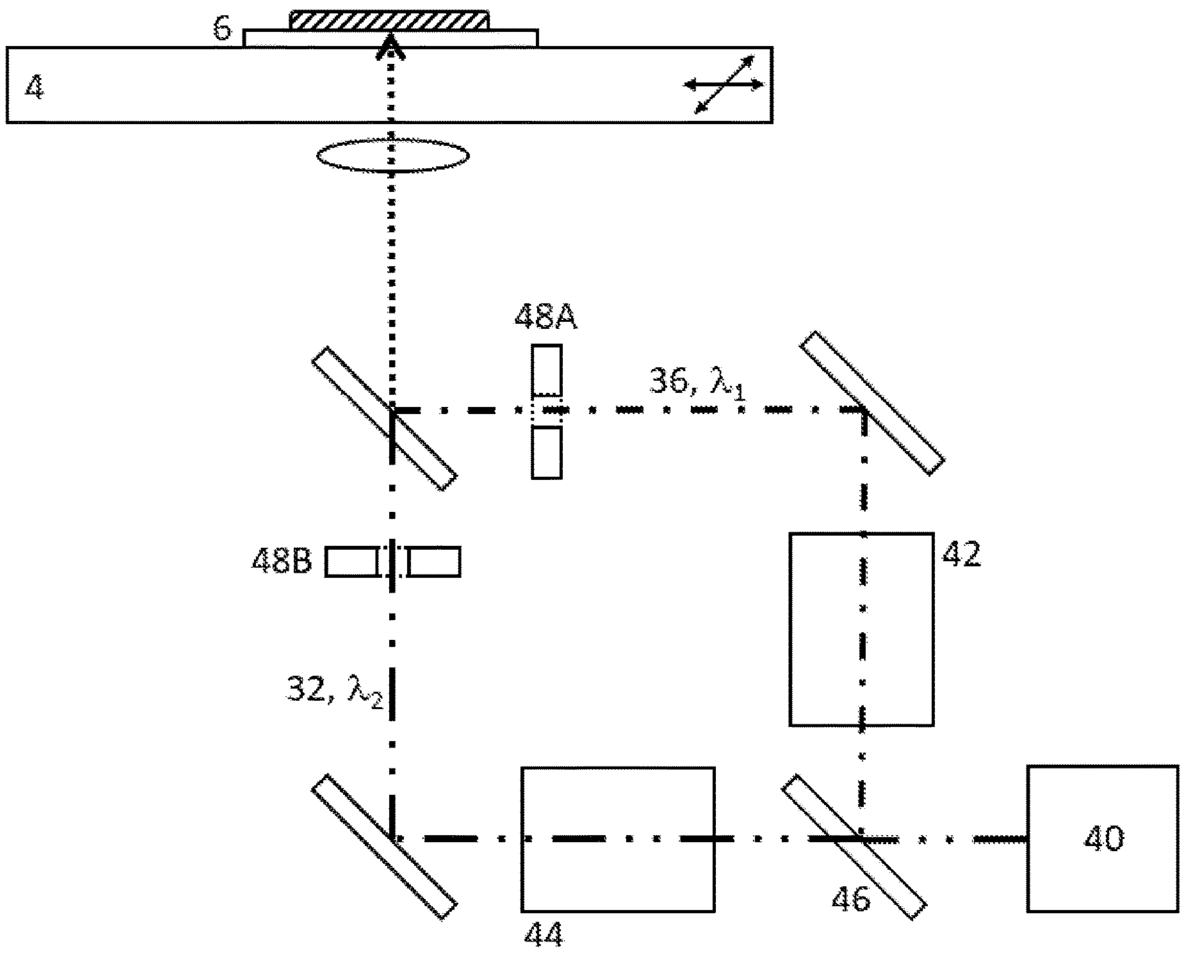
FIG. 2 shows a schematic example embodiment in which desorption device and ionization device use laser light from the same laser system to produce an energy burst or a sequence of energy bursts and post-desorption ionization.

FIG. 2 illustrates a modified arrangement for an embodiment in which both desorption/ablation as well as post-desorption ionization are effected by energetic electromagnetic waves (32, 36) transmitted through a holder (4) and through a substrate (6), as shown in FIGS. 1A to 1D. Here, the desorption device and ionization device share not only several optical elements, but also a laser system (40). The extraction device is not shown in this example for reasons of clarity.

Desorption device and ionization device differ here particularly in the assigned frequency multiplier paths (42, 44), which can condition an original beam or original pulse of the laser system (40) to different wavelengths. This can be achieved by a polarization-dependent beam splitter (46), which deflects the laser light of a specific polarization, which can be imposed in the laser resonator of the laser system (40), to a first multiplier path (42), while laser light with a different polarization is transmitted to a second multiplier path (44). The differently conditioned beams or pulses can then be brought together again on one optical path before they pass through the holder (4) and the substrate (6). Alternatively, the beam splitter (46) can also pass the electromagnetic waves of the original laser beam or pulse on to both multiplier paths (42, 43) at the same time. The conditioned beam or pulse can be selected to be guided through the holder (4) and the substrate (6) by switchable diaphragms (48A, 48B) just before the branched optical paths merge.

The intensity of the conditioned beams or pulses of each sub-path can be set by the beam splitter (46). In particular, an attenuator can be inserted into at least one or into each sub-path to keep possible pulse-to-pulse variations small. It is preferable that the switchable diaphragms can also blank pulses by means of fast electrooptical elements. Other wavelengths which are not of interest can also be filtered out with the aid of Pellin-Broca prisms and/or dichroic filters.

The length of the optical paths is preferably the same for both sub-paths, as shown, to simplify the temporal coordination of the switching state of the diaphragms (46A, 48B). It is understood that a sub-path does not require a multiplier path when the original wavelength of the laser system (40) is already suitable for one of the purposes, i.e., desorption/ablation or post-desorption ionization.

Figure 3:
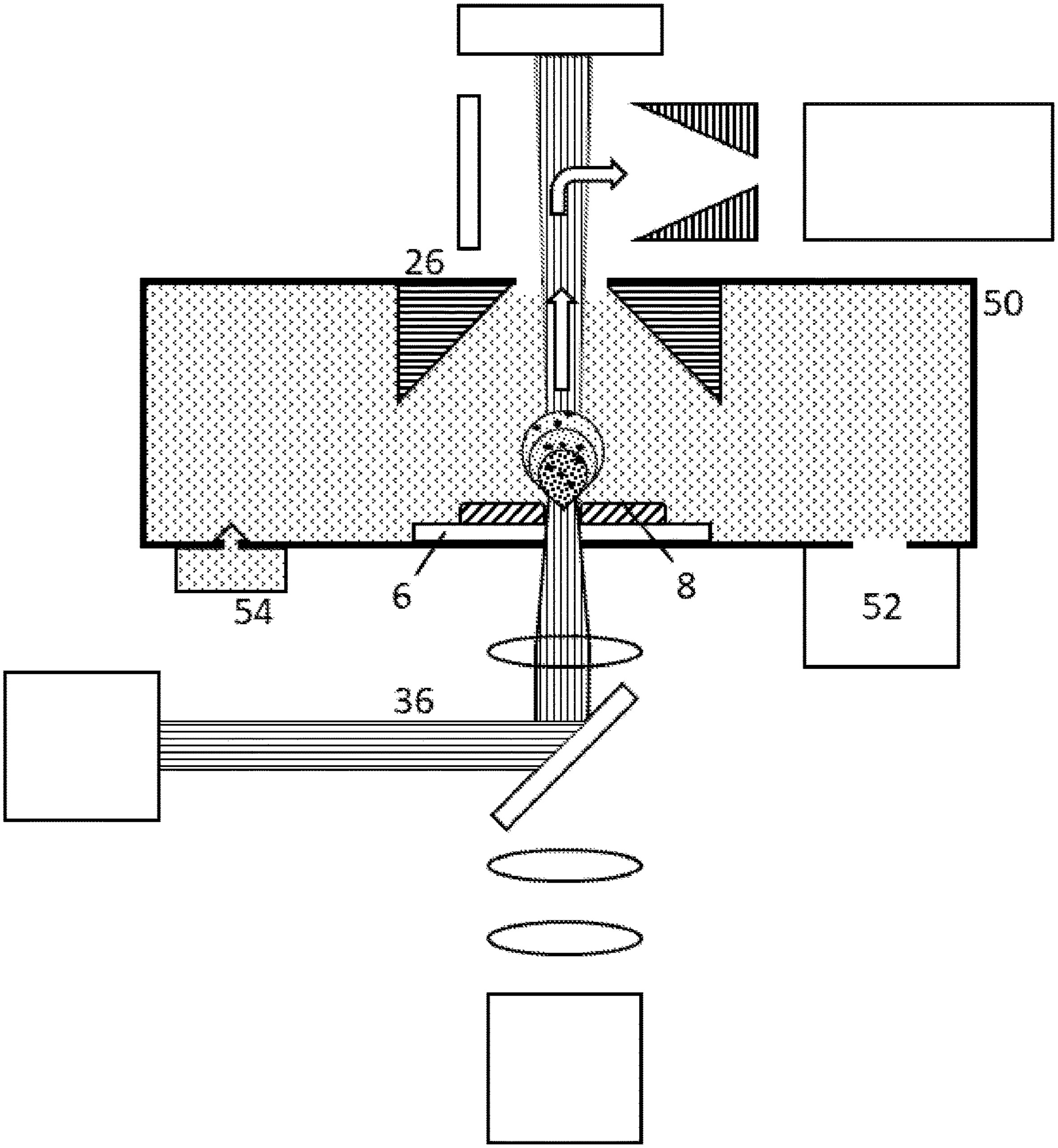
FIG. 3 shows a schematic example embodiment in which the support device and parts of the extraction device are located in a pumped chamber.

FIG. 3 illustrates a further modification of the set-up from FIGS. 1A to 1D, where a state corresponding to the third step from FIG. 1D is shown. The substrate (6) with the sample material deposited on it (8) as well as one of the RF funnels (26) of the extraction device are located in a chamber (50), in which a conditioned gas environment can be generated. A pump (52) is connected to the chamber (50) and maintains predetermined pressure conditions. For example, the pressure in the chamber (50) can be below atmospheric pressure ($<10^2$ hectopascal), preferably in a medium vacuum ($>10^{-3}$ hectopascal), e.g., at 1-10 hectopascal. The chamber (50) is simultaneously connected to a gas feeder (54), through which a buffer gas, a reactive gas (e.g., methane), a moist gas (e.g., water vapor), and/or a dopant gas, can be fed into the chamber (50) so that an equilibrium of gas inflow and outflow can be set and controlled. Inert gases such as nitrogen or helium are possible buffer gases. Possible dopant gases include a number of volatile solvents, which can serve as additional ionization mediators in the gaseous phase, and interact with the electromagnetic waves (36) of the ionization device to provide charge carrier donors by optical or photo-excitation, said donors transferring charge carriers such as protons onto neutral, desorbed sample molecules. With this approach, the optical or photo-excitation processes in the gaseous phase are not restricted to desorbed molecules (like matrix molecules with MALDI ionization, for example), and can expand the supply of charge carriers, for example by means of proton donors in the gaseous phase above the desorption site.

Figure 4A:
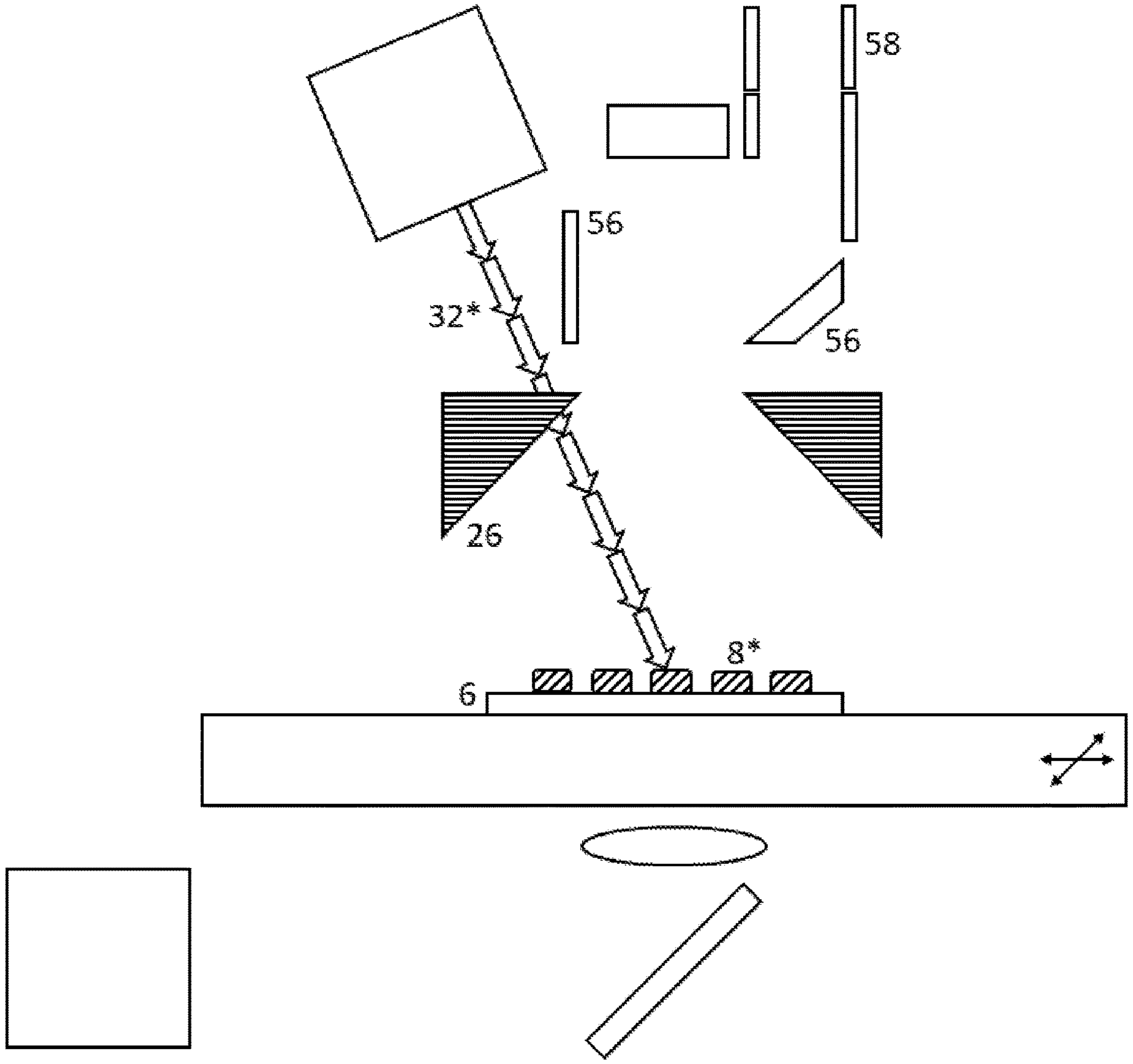
FIG. 4A schematically shows a first step in the operation of a further example embodiment of a device according to the present disclosure.
Figure 4B:
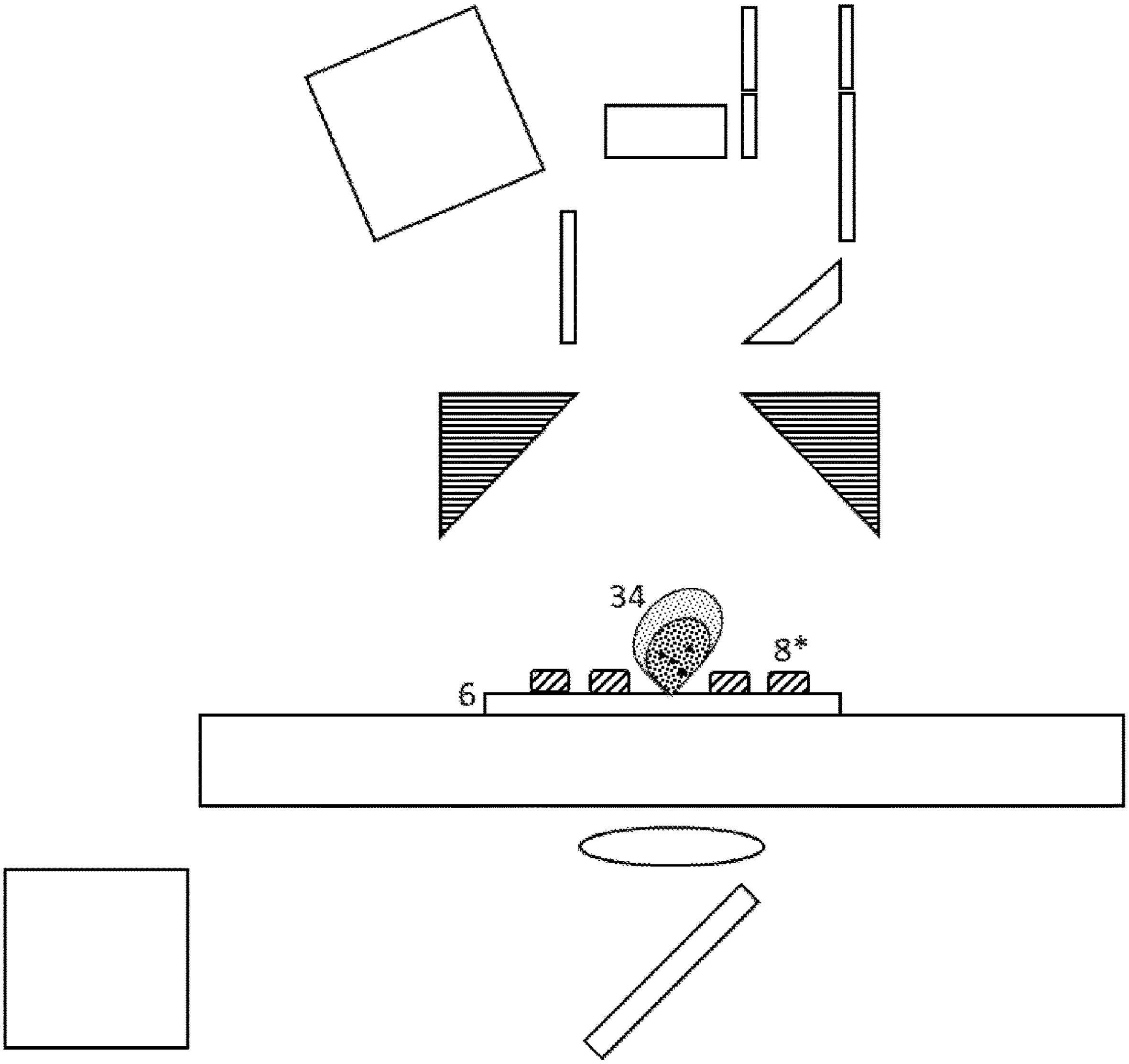
FIG. 4B schematically shows a second step in the operation of the embodiment of FIG. 4A.
Figure 4C:
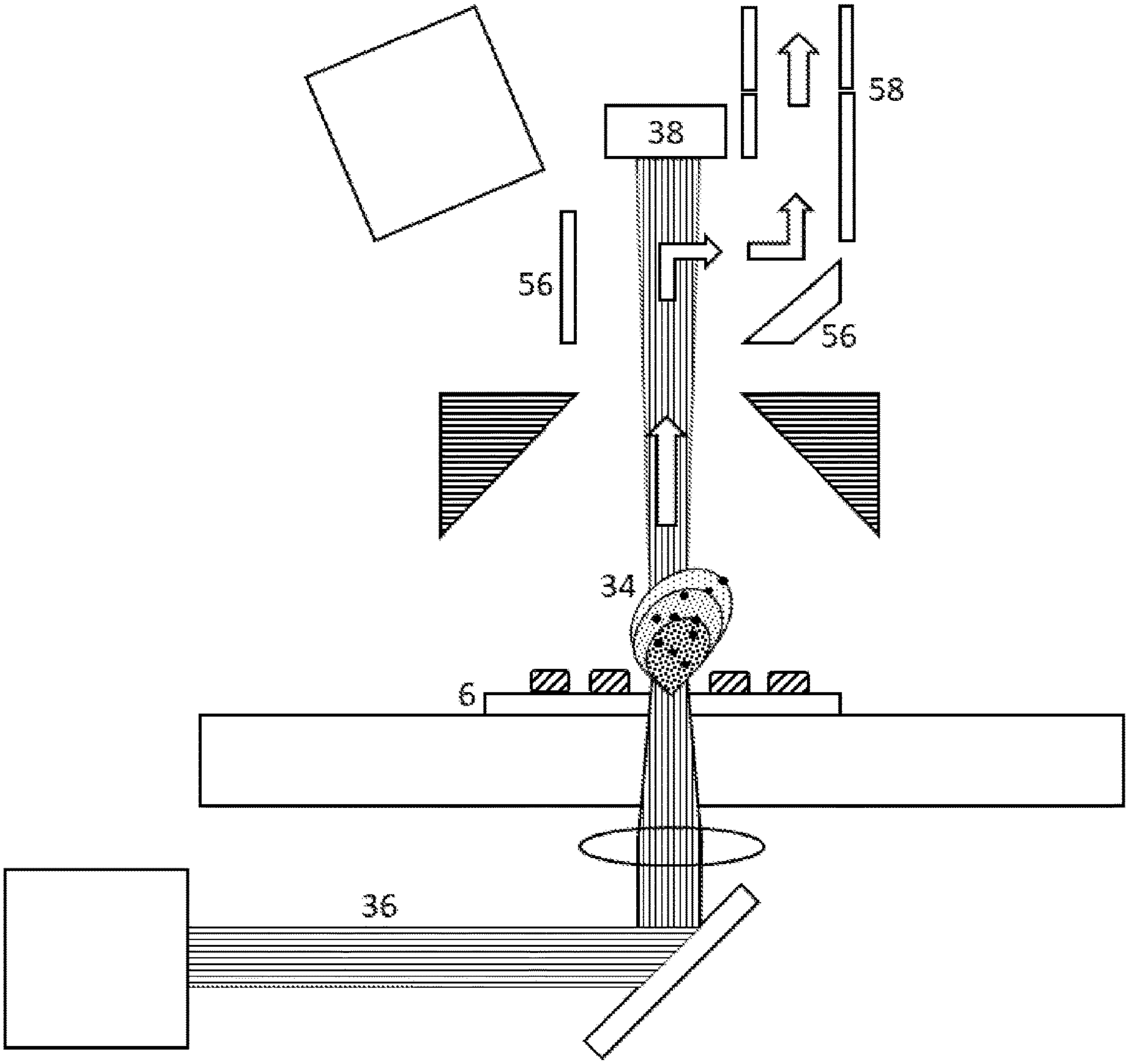
FIG. 4C schematically shows a third step in the operation of the embodiment of FIG. 4A.

FIGS. 4A to 4C show a further embodiment in which the principles of the present disclosure are realized. The support device and the ionization device here can correspond to the embodiment from FIGS. 1A to 1D and are therefore not further explained here. Differences lie particularly in the desorption device and the extraction device, which will be explained in more detail below.

In this example, the desorption device comprises a system which directs an energetic beam (32*) at a slightly oblique angle of incidence from the front onto the substrate (6), which in this embodiment is coated with individual sample deposits or sample preparations (8*). When the energetic beam (32*) is a laser beam, which ablates an individual sample (8*), and the sample material was prepared with a condensed MALDI matrix substance, e.g., an organic acid, it can be called ablation in a reflection mode, in contrast to ablation in a transmission mode, as is illustrated in FIGS. 1A to 1D.

In the example shown, the extraction device contains an RF funnel (26) for accepting and spatially focusing ions from a desorption cloud, said funnel having a local recess across the stack of diaphragm electrodes for the passage of the energetic beam (32*) (not shown), and in addition a plurality of deflection electrodes arranged opposite each other (56) behind the RF funnel (26), to the side of the direction of propagation of the cloud, to which voltages can be applied permanently or temporarily in such a way that extracted ions change their direction of motion twice by around 90° in each case. Further electrodes (58) of an ion guide can then guide the deflected ions to a connected analyzer (not shown) on a path which is essentially parallel to the original extraction direction of the ions through the RF funnel (26).

FIG. 4A depicts a first step with desorption of an individual sample deposit (8*) by an energetic, pulsed beam (32*). As can be seen in FIG. 4B in a second step, a desorption cloud (34) which was generated from the material of the deposited and possibly prepared sample (8*) expands above the desorption site on the substrate (6), in this case at a slightly oblique angle with respect to the surface normal above the substrate (6), since the direction of incidence of the desorbing pulse sequence (32*) is correspondingly angled. FIG. 4C, in contrast, shows the triggering of a pulsed post-desorption ionization beam of electromagnetic waves (36), which pass through the support device and the substrate (6) in transmission from the rear to the front at a location which corresponds to the desorption site, and completely penetrate the desorption cloud (34) in the direction of its propagation. The energy input into the cloud (34) serves to excite desorbed neutral molecules, with the consequent increase in the supply of charge carriers, which increases the ionization probability and improves the detection sensitivity in the connected analyzer (not shown).

The ions generated essentially follow the path indicated by the arrows between the deflection electrodes (56, 58) of the extraction device, whereas neutral components dissipate and thin out in the source region. On the other hand, unused portions of the electromagnetic waves (36) of the ionization device can be absorbed by a beam dump (38) in the optical path, and neutralized.

After the ions formed during the desorption and subsequent post-desorption ionization have been extracted from the desorption cloud (34) and passed on to the analytical system, the holder (4) can move the substrate (6) into a further desorption position (x-y translation), including an adjustment of the focus (z-translation) where necessary, so that a still unprocessed individual sample (8*) can be analyzed, as is usual for individual MALDI spot preparations on an AnchorChip™ plate, for example.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention, which is defined solely by the appended claims, including any equivalent implementations, as the case may be.

The invention claimed is:

1. An apparatus to generate ions from sample material deposited on a substrate which is at least partially transparent to electromagnetic waves, comprising:

a support device which has a holder for the substrate, a desorption/ionization unit which contains a desorption device and an ionization device, said desorption device being arranged and designed to desorb deposited sample material from a desorption site on the substrate using at least one energy burst, and said ionization device being arranged and designed to irradiate the desorbed sample material above the substrate with a beam of electromagnetic waves after the at least one energy burst, wherein the beam of electromagnetic waves passes through the substrate before encountering the desorbed sample material at a location which corresponds to the desorption site, an extraction device which is arranged and designed to extract ions from the desorbed sample material and transfer them into an analyzer, and further being configured to allow an unused portion of the beam of electromagnetic waves, which has passed through desorbed sample material above the substrate without interacting with molecules therein, to pass; and a beam dump located substantially behind the extraction device and configured to catch said unused portion of the beam of electromagnetic waves which has passed the extraction device.

2. The apparatus according to claim 1, wherein the support device contains a chamber in which the holder for the substrate is located, and which is arranged and designed to create a conditioned environment for the substrate including the deposited sample material.

3. The apparatus according to claim 2, wherein the chamber is connected to a vacuum source to evacuate the environment of the deposited sample material.

4. The apparatus according to claim 2, wherein the chamber is connected to a gas feed device which is arranged and designed to feed an inert buffer gas, a reactive gas, a moist gas, and/or a dopant gas which is susceptible of absorbing electromagnetic waves, into the chamber.

5. The apparatus according to claim 1, wherein the desorption device is arranged and designed to direct an energetic beam onto the deposited sample material to trigger the at least one energy burst.

6. The apparatus according to claim 5, wherein the energetic beam is a laser beam to ablate the deposited sample material.

7. The apparatus according to claim 5, wherein the energetic beam passes through the substrate at the position which corresponds to the desorption site before encountering the deposited sample material.

8. The apparatus according to claim 1, wherein the ionization device contains a laser to generate coherent electromagnetic waves, a discharge lamp, or a light-emitting diode (LED).

9. The apparatus according to claim 8, wherein the laser operates in pulsed operation or continuous-wave operation in discontinuous mode, or the discharge lamp or LED has a flash-like or continuous emission characteristic.

10. The apparatus according to claim 1, wherein the ionization device is arranged and designed to irradiate the desorbed sample material with a pulsed beam of electromagnetic waves which is temporally coordinated with the at least one energy burst.

11. The apparatus according to claim 1, wherein the desorption device and the ionization device use a same original beam of coherent electromagnetic waves, which is conditioned to different energies for desorption/ablation and ionization.

12. The apparatus according to claim 1, wherein the extraction device includes at least one deflection electrode, which is arranged and designed so that extracted ions change their direction of motion at least once.

13. A method to generate ions from sample material, comprising:

depositing the sample material on a substrate which is at least partially transparent to electromagnetic waves, desorbing the deposited sample material from a desorption site on the substrate using at least one energy burst, ionizing particles and/or molecules in the desorbed sample material above the substrate after the at least one energy burst by irradiating them with a beam of electromagnetic waves which pass through the substrate at a position which corresponds to the desorption site before they encounter the desorbed sample material, extracting ions from the desorbed sample material and transferring them into an analyzer, and catching an unused portion of the beam of electromagnetic waves, which has passed through desorbed sample material above the substrate, without interacting with molecules therein, using a beam dump located substantially behind a position where ions are extracted.

14. The method according to claim 13, wherein the sample material comprises a tissue section, a homogenate, or individual material deposits on the substrate.

* * * * *